United States Patent [19]

Rozniecki

[11] 4,245,660
[45] Jan. 20, 1981

[54] MANUAL OVERRIDE FOR SHORT STROKE VALVE

[75] Inventor: Edward J. Rozniecki, St. Clair Shores, Mich.

[73] Assignee: The United States of America as represented by the Secretary of the Army, Washington, D.C.

[21] Appl. No.: 91,425

[22] Filed: Nov. 5, 1979

[51] Int. Cl.³ .................. F16K 13/04; F16K 13/06
[52] U.S. Cl. .......................... 137/68 A; 137/68 R; 222/5; 222/80; 251/80; 251/294; 169/11
[58] Field of Search ............... 137/67, 68 R, 68 A, 137/70; 222/5, 80; 169/11; 251/80, 294

[56] References Cited

U.S. PATENT DOCUMENTS

| | | | |
|---|---|---|---|
| 1,977,288 | 10/1934 | Purdy | 251/80 |
| 2,415,099 | 2/1947 | Hooper | 251/80 |
| 3,059,814 | 10/1962 | Poncel et al. | 137/68 A |
| 3,474,809 | 10/1969 | Gorclon | 137/70 |
| 3,491,783 | 1/1970 | Linsalato | 137/68 A |
| 3,712,319 | 1/1973 | Rhodes et al. | 137/68 R |
| 3,983,897 | 10/1976 | Gebelius | 137/67 |

Primary Examiner—Martin P. Schwadron
Assistant Examiner—G. L. Walton
Attorney, Agent, or Firm—Peter A. Taucher; John E. McRae; Nathan Edelberg

[57] ABSTRACT

A dual valve actuator mechanism for a fire extinguisher bottle in a military vehicle. The mechanism includes an electrical trigger system for operating the valve automatically in response to energization of an electronic optical fire sensor; alternately the electrical trigger system can be operated by closure of a manual switch from within the vehicle interior. A second cable system is provided to operate the valve manually from a point external to the vehicle, as when the vehicle is unoccupied at onset of the flame or when the soldiers are forced to exit the vehicle to avoid inhalation of fumes or vapors. Unfortunately the valve actuation stroke is very small, on the order of two-tenth inch or less. The present invention relates to a lost-motion connection in the cable for lengthening the stroke necessary to operate the valve; this prevents inadvertant valve actuation due to vehicle vibrations or installation tolerances.

3 Claims, 3 Drawing Figures

MANUAL OVERRIDE FOR SHORT STROKE VALVE

The invention described herein may be manufactured, used, and licensed by or for the Government for governmental purposes without payment to me of any royalty thereon.

BACKGROUND AND SUMMARY OF THE INVENTION

In a known fire suppression system for military vehicles one or more pressure-resistant bottles are charged with a vaporizable fire-suppressant liquid, such as bromotrifluoromethane, at a pressure of approximately 750 p.s.i.; nitrogen is used as a pressurizing agent, as outlined generally in U.S. Pat. No. 3,915,237 granted to me on Oct. 28, 1975. Outflow of suppressant from each bottle toward the expanding flame is controlled by an electrically-operated valve secured directly to the bottle. The valve can be operated by an explosive squib, as shown for example in U.S. Pat. No. 3,491,783 to Linsalato or 3,474,809 to Gordon. The valve can also be a pilot-operated solenoid valve.

The valve has an outlet that communicates directly with the target zone in which the flame is expected to occur. Alternately the valve outlet may be connected to a pipe or tube leading to the expected flame area. There are generally two types of fires to be expected, namely slow-growth fires and near-explosive fires. Slow growth fires can occur in either the crew compartment or the engine compartment, due to a variety of different causes such as leakage of hydraulic fluid or liquid fuel, loosened electrical connections, or debris accumulation. Fires of near-explosive proportions can occur when an enemy shell passes through a fuel tank in the engine compartment or crew compartment; the fireball expands rapidly within milliseconds.

In order to best contain both the slow growth fires and the near-explosive fires in different areas of the vehicle it has been the practice to use an electrical valve trigger system that includes an electronic-optical fire sensor and a manual switch (located at the driver station). The optical fire sensor provides an automatic quick-acting response to near-explosive fireballs; the manual switch provides the driver with selective response to slow-growth fires. In addition, it has been the practice to provide each bottle with a second manual valve actuation system that can be operated from a point external to the vehicle. This second manual valve actuation system comprises a cable extending from the respective valve actuator through the hull wall to a pull-type handle located on the hull exterior surface (usually located at the front end of the vehicle). The pull-type handle is to be operated when the vehicle is unoccupied at the onset of the flame (in which case the soldiers might not have time to reach the switch at the driver station), or when conditions within the vehicle dictate that the soldiers exit the vehicle before attempting to extinguish the flame.

The valves now used in existing vehicle fire suppressant systems have actuator devices that travel only very short distances, on the order of one tenth or two tenth inch, before triggering the valve element to its flow-open position. With such a very short travel it is sometimes difficult to ensure a reliable actuation of the cable system, when needed. Problems arise due to such factors as premature triggering of the valve element due to initial installation errors, in-service vehicle vibration or vehicle turn forces, and inertia forces in the cable system. Another problem relates to the user's inability to reliably ascertain whether the valve is actually open; when the soldier exerts a pull action on the handle of the cable he is never quite certain that the very slight resultant handle movement has opened the valve or has merely taken up slack in the cable system.

The present invention is directed to a remotely-actuable cable system for a fire extinguisher valve, wherein the cable is subdivided into two separate cable sections joined together by a lost motion connection. The use of such a lost motion connection is advantageous in that it magnifies the motion required at the handle compared to the motion experienced at the valve actuator. For example, if we assume a lost motion of nine-tenth inch, then a one-tenth inch valve actuator motion requires a one inch handle pull motion. The user is able to accelerate the handle through a one inch motion distance and receive sensory feedback of a perceptible motion.

The lost motion connection envisioned by applicant preferably includes a compression spring arranged to exert a progressively increasing force on the valve actuator as the manual pulling force is applied to the handle at the outer end of the cable. The spring force and spring rate are selected so that the valve is actuated to the flow-open position before the handle reaches the full limit of its motion. Therefore, the user is certain that the valve is actuated even though the handle is not pulled through a complete stroke. Also, since a significant movement of the cable is necessary to actuate the valve there is a lessened likelihood that vehicle vibrational forces will prematurely trigger the valve to the flow-open condition.

IN THE DRAWINGS

FIG. 1 fragmentarily illustrates a fire extinguisher bottle valve assembly utilizing my invention.

Figure 1:
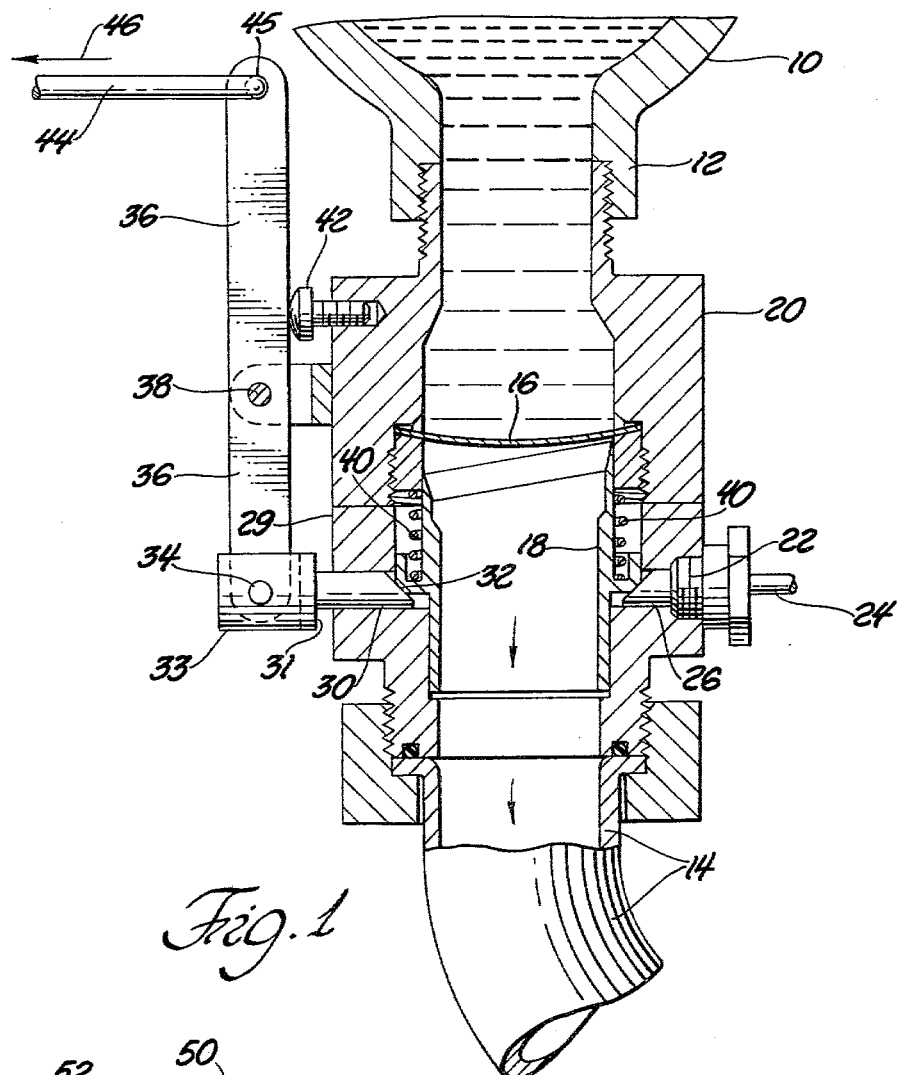

Referring in greater detail to FIG. 1, there is shown a fire-extinguisher bottle 10 having a neck 12 at its lower end for discharging pressurized liquid fire suppressant, such as bromotrifluoromethane, downwardly through a tube or pipe 14 when a frangible metal disk 16 is punctured by an annular cutter element or actuator 18. Disk 16 is suitably mounted within a valve body 20, as more completely described in U.S. Pat. No. 3,491,783 to O. L. Linsalato.

One or more bottles 10 would be positioned upright (valve down) in the crew compartment of a military tank for discharge of liquid fire suppressant toward fires occurring in the crew compartment or engine compartment. Pipe 14 would have a length and direction for covering a specific zone within the vehicle. In one particular vehicle two such bottles, stationed within the crew compartment, have discharge tubes 14 leading through a bulkhead into spaces between the engine and its fuel tanks; the ends of the tubes are perforated to provide a suitable spray pattern of fire-suppressant vapor. A third bottle is provided with a relatively short discharge tube for suppressing fires within the crew compartment.

The valve for each bottle is equipped with an explosive squib 22 having an electrical energization wire or line 24 connected to a current source, not shown, whereby a step voltage change in the line fires the squib cartridge, thus driving plunger 26 leftwardly; cutter element 18 is thereby cammed upwardly to pierce diaphragm disk 16, whereupon the pressurized liquid (at about 750 p.s.i.) completely ruptures the disk and simultaneously flows rapidly from the bottle through pipe 14, toward the flame source. Voltage through line 24 may be controlled either by a manual switch at the driver station and/or by an optical-electronic sensor targeted on a vehicle space in which a flame is expected to break out. A suitable sensor is manufactured by Santa Barbara Research Center under its designation PM-34. U.S. Pat. No. 3,825,754 issued to R. Cinzori et al describes features and operation of this type sensor.

The present invention is directed to the features of an alternate mechanism for operating actuator 18 from a point external to the vehicle, as when a fire breaks out in an unoccupied vehicle, or conditions require quick exit of all personnel from the vehicle, or when the electrical supply to line 24 is for any reason interrupted. The alternate mechanism includes a pusher element 30 in the form of a second plunger having a cam surface 32 adapted to cam actuator 18 upwardly a sufficient distance to pierce disk 16 for opening the valve. Pusher element 30 includes a slotted cylindrical section 33 having a pivotal connection 34 with a lever 36 suitably fulcrummed at 38 on the valve body. A compression spring 40 indirectly biases lever 36 clockwise about pivot 38 to its illustrated position engaged with an adjustable stop screw 42. A cable 44 is suitably connected to the lever, as at 45, whereby a manual force in the arrow 46 direction moves lever 36 counterclockwise about pivot 38 to thus move element 30 in a rightward direction for operating actuator 18.

Figure 2:
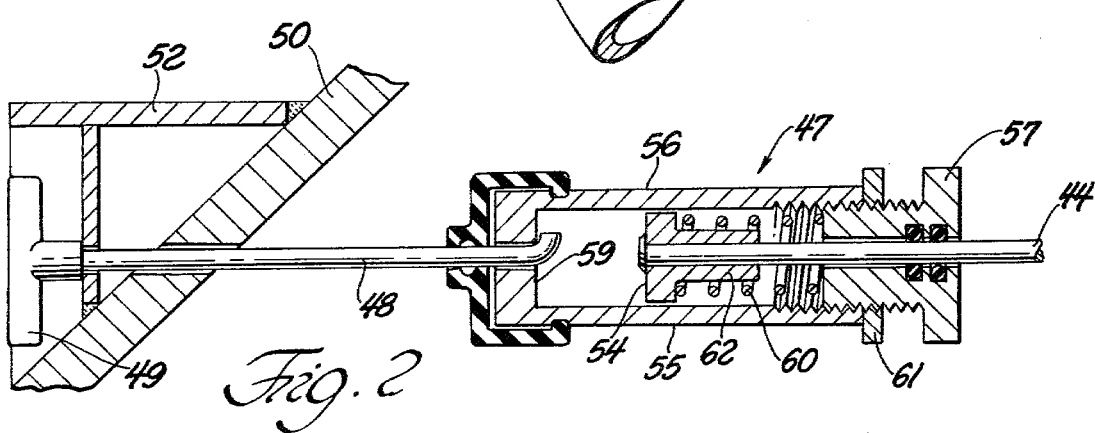
FIG. 2 illustrates a cable system used with the FIG. 1 valve, and embodying my invention.

FIG. 1 shows one end of cable 44; the other end of the cable is shown in FIG. 2. Cable 44 has a lost-motion connection 47 with a second cable 48 suitably joined to a manual pull-type handle 49 located external to the hull wall 50, e.g. at the nose end of the hull. The handle may be protected against inadvertant actuation by partial enclosure thereof within a hood 52; additionally, a breakable safety wire, not shown, may be extended around the handle. The drawings show a single bottle 10 and cable-type actuation system. However, it will be understood that each of the bottles would or might be provided with such a cable system, in which case all of the various handles 49 would be located within a common hood 52 for individual actuation, as necessary.

The principal feature of interest in my invention is the lost-motion connection 47. As seen in FIG. 2, this connection includes a piston 54 welded or otherwise secured to cable 44, and a cylinder 55 comprised of two threaded tubular members 56 and 57 that are adjustable to vary the effective length of the defined cylinder. A compression coil spring 60 is trained between the large diameter section of the piston and the cylinder end wall 57, thereby urging the piston to the left and the cylinder to the right. This action takes up slack in the cables and also applies a preload force on lever 36 (FIG. 1) tending to move the lever in a counterclockwise direction about pivot axis 38. The pre-load force is opposed by spring 40. The value of the pre-load force on lever 36 can be varied by manual thread adjustment of tubular member 57 along member 56; a lock nut 61 is provided to secure the members in their adjusted positions.

In use of the described cable system, a manual leftward pull on handle 49 initially moves cylinder 55 to the left, thereby increasing the compressive force on spring 60. The spring in turn applies an increased force on piston 54 and the connected cable 44. The spring 60 force tends to move pusher element 30 to the right, whereas the spring 40 force tends to move pusher element 30 to the left. When handle 49 has been pulled out far enough so that the spring 60 force is greater than the spring 40 force the piston element will be moved leftwardly to operate the valve actuator 18. The point in the handle stroke at which valve actuation occurs is determined by the pre-load force and by the spring rate of spring 60. Preferably the rate of spring 60 is selected so that the valve is actuated before completion of the handle stroke. In the FIG. 2 system the handle completes its stroke when cylinder wall 57 strikes the end surface of small diameter piston section 62. At that point the piston-cylinder assembly functions as a rigid connection between the two cable sections 48 and 44; assuming that pusher element 30 has been actuated, there will be no further handle motion.

It will be seen that handle 49 moves through a relatively long distance (the spacing between piston 54 and cylinder end wall 57), whereas pusher element 30 moves through a relatively short distance (the spacing between plunger surface 31 and valve body surface 29). In the conventional valves now used the pusher element movement is only about one tenth or two tenth inch. If pusher element 30 were operated directly, without lost motion connection 47, the user might not be able to discern whether a pulling force on the handle was effective to operate the valve. When the cable system is provided with a lost-motion connection, the relatively large handle motion (e.g. one inch) is readily felt at the user's hand. Assuming the valve is actuated midway through the handle stroke, then the user has reasonable assurance of valve actuation even though he might not pull the handle completely out. The user can pull out the handle a significant distance, but not necessarily a precise distance, and receive sensory feedback of a valve-actuated condition. At the same time, there is assurance that slight cable motion due to vehicle vibration, etc. will be ineffective to prematurely trigger the valve open. The relatively long pre-load adjustment of member 57 (at initial installation of the cable system) permits the take-up of cable slack and relatively accurate pre-load force attainment, which would not otherwise be possible in a conventional short-stroke cable system.

Figure 3:
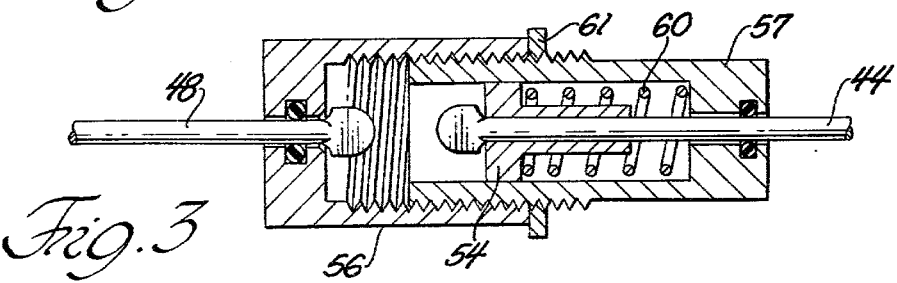
FIG. 3 illustrates a variation of the device shown in FIG. 2.

The lost-motion connection can be varied as to structural detail. For example, FIG. 3 illustrates a variation wherein piston 54 slidably engages tubular section 57 rather than section 56. Operation is the same as previously described.

I wish it to be understood that I do not desire to be limited to the exact details of construction shown and described for obvious modifications will occur to a person skilled in the art.

I claim:

1. In a military vehicle equipped with an interior fire extinguisher bottle for suppressing fires within the vehicle, a diaphragm disk (16) controlling outflow of fire-suppressant fluid from the bottle, an actuator (18) for piercing said diaphragm disk, a first electrically-energized pusher element (26) for operating the actuator, a second manually-operated pusher element (30) movable from a normal retracted position to also operate the actuator, a lever (36) connected to the pusher element for applying a push force thereon, a pull-type handle located on an exterior surface of the vehicle, and a cable trained between the handle and the lever for translating a pull action on the handle into a push action of the lever on the aforementioned second pusher element: the improvement wherein the cable includes first and second cable sections connected respectively to the lever and handle, and lost-motion connection means joining the cable sections, whereby a given motion of the lever requires a magnified motion of the handle in proportion to the motion loss experienced in the connection means; said lost-motion connection means comprising a cylinder connected to one of the cable sections, a piston connected to the other cable section and being slidably positioned within the cylinder, and a compression spring engaged with the piston and one end wall of the cylinder to remove slack in the cable sections when the second pusher element is in its retracted position.

2. The improvement of claim 1; the cylinder being comprised of two tubular sections threaded one on another to adjust the at-rest position of the aforementioned cylinder end wall in relation to the piston; the compression spring having a spring rate that enables the second pusher element to operate the valve actuator before the piston abuts against said cylinder end wall.

3. The improvement of claim 2; the piston including a large diameter section engaged with the compression spring and a small diameter section extending within the spring in spaced axial alignment with the aforementioned end wall of the cylinder, whereby a pulling action on the handle causes the coil spring to be progressively compressed until the small diameter section of the piston abuts against the cylinder end wall, at which time the piston-cylinder functions as a rigid connection between the two cable sections.

* * * * *